No. 848,203. PATENTED MAR. 26, 1907.
J. RICHTER.
APPARATUS FOR PULLING UP RODS, PILES, PICKETS, AND THE LIKE FROM THE GROUND.
APPLICATION FILED DEC. 4, 1906.

WITNESSES:

INVENTOR,
JOSEF RICHTER,
BY Attorney.

UNITED STATES PATENT OFFICE.

JOSEF RICHTER, OF DIESPECK-ON-THE-AISCH, GERMANY.

APPARATUS FOR PULLING UP RODS, PILES, PICKETS, AND THE LIKE FROM THE GROUND.

No. 848,203.  Specification of Letters Patent.  Patented March 26, 1907.

Application filed December 4, 1906. Serial No. 346,216.

*To all whom it may concern:*

Be it known that I, JOSEF RICHTER, a subject of the Emperor of Austria, residing at Diespeck-on-the-Aisch, in the Kingdom of Bavaria and Empire of Germany, have invented new and useful Improvements in Apparatus for Pulling Up Rods, Piles, Pickets, and the Like from the Ground, of which the following is a specification.

My invention relates to apparatus designed for enabling rods, piles, pickets, and the like to be easily pulled from the ground.

The improved apparatus comprises a lever pivoted upon a stand and having a pair of tongs suspended therefrom, the pivot of which is adapted to slide upon a vertical guide bar to prevent the tongs from moving sidewise.

According to this invention the jaws of the tongs are so connected to the stand by chains of a definite length that they will be opened automatically in the downward movement of the tongs to their lowest position.

Figure 1:
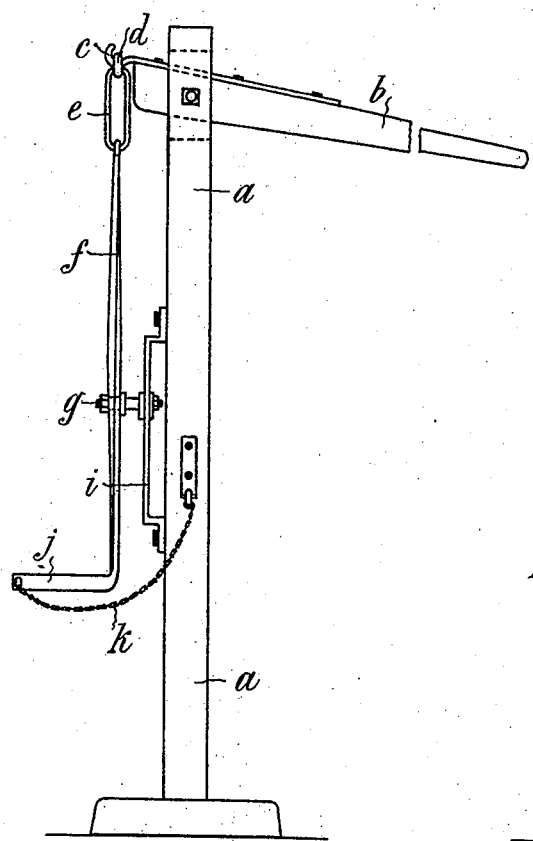
Figure 2:
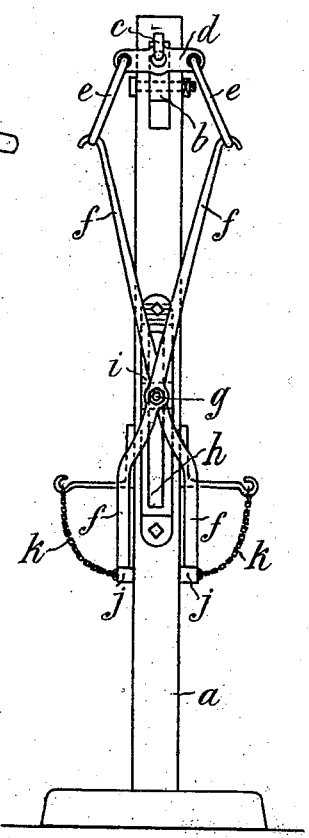

In the accompanying drawing a constructional form of the invention is represented, Figure 1 being a side elevation, and Fig. 2 a front elevation, of the same.

A stand $a$, provided with a broad base-plate or foot, carries at its upper end a hand-lever $b$, the short arm of which has a hook $c$ secured thereto. From this hook I suspend the tongs $f$ by means of links $d\ e$, the pivot $g$ of these tongs being arranged to slide up and down upon a guide-bar $i$, furnished with a slot $h$. The forwardly-bent jaws $j$ of the tongs are provided with teeth cut so as to prevent them from sliding upon the rods or the like to be pulled. By chains $k$ of a definite length the jaws $j$ are connected with the stand through the medium of lateral arms in such a manner that the tongs $f$ in the downward movement before reaching their lowest position will be checked by the chains, and consequently opened automatically.

For pulling a rod or the like from the ground the free end of the hand-lever $b$ is raised to such an extent that the tongs $f$ occupy their lowest position, the jaws $j$ being opened for taking hold of the rod on both sides, which takes place immediately on the depression of the free end of the lever, so that when this end is continuously moved down the rod will be pulled from the ground. In the case of rods driven deeply into the earth this operation may be repeated.

As will be readily understood, my improved apparatus is operated in an exceedingly simple, convenient, and easy manner.

What I claim as my invention, and desire to secure by Letters Patent, is—

1. In apparatus of the character described, a stand, a lever pivoted thereto, tongs connected to this lever and adapted to move along the stand, and chains connecting the tongs with the said stand, substantially as herein set forth.

2. In apparatus of the character described, a stand, a lever pivoted to the upper end of the stand, tongs adapted to move along this stand, links connecting the upper ends of the tongs with the said lever, and chains connecting the lower ends of the tongs with the said stand, substantially as herein set forth.

3. In apparatus of the character described, a stand, a lever pivoted to the upper end of the stand, tongs adapted to move up and down along this stand, links connecting the upper ends of the tongs with the said lever, arms secured to the sides of the stand, and chains connecting the lower ends of the tongs with the said arms, substantially as herein set forth.

4. In apparatus of the character described, a stand, a lever pivoted to the upper end of the stand, tongs having forwardly-bent jaws and adapted to move up and down along the stand, links connecting the upper ends of the tongs to the said lever, a bar for guiding the pivot of the tongs in their up and down movements, arms secured to the sides of the stand, and chains connecting the lower ends of the tongs with the said arms, substantially as herein set forth.

In testimony whereof I have signed my name to this specification in the presence of two subscribing witnesses.

JOSEF RICHTER.

Witnesses:
  KARL HACFUESZ,
  CARL SINGER.